Figures 1A, 1B, 5:
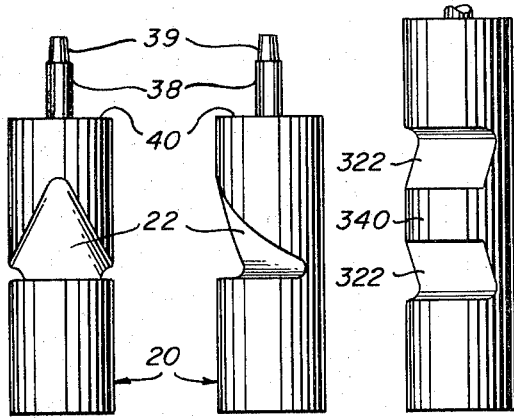

Jan. 10, 1967  J. W. CHURCH ETAL  3,297,051
SINGLE HANDLE MIXING FAUCET
Filed Feb. 10, 1964

INVENTORS
JAMES W. CHURCH
GORDON F. PEARCE
BY *Smart & Biggar*
ATTORNEYS.

3,297,051
SINGLE HANDLE MIXING FAUCET
James Walter Church, Preston, and Gordon Frederick Pearce, Waterloo, Ontario, Canada, assignors to Wallaceburg Brass Limited, Wallaceburg, Ontario, Canada
Filed Feb. 10, 1964, Ser. No. 343,684
Claims priority, application Canada, Jan. 15, 1964, 893,336
2 Claims. (Cl. 137—625.17)

This invention is directed to a control valve for controlling flow of fluids being suited for use as a mixing valve for mixing fluids, by means of which the quantity and relative proportions of two fluids may be regulated by a single control member.

In particular a control valve of this type is suited for use as a single handle mixing faucet whereby the quantity and temperature of water dispensed from a hot and cold source may be selectively controlled.

Single handle mixing faucets are generally well known, and are characterized by their complexity and cost of manufacture, and their tendency to instability in proportioning, due generally to variations in expansion produced between the valve closure members and their seats as a result of local changes of temperature, particularly with regard to the hot water control valve.

It is an object of the invention to provide a very simple but effective mixing valve, having a single moving part in the operative mechanism obtained by arranging the flow path of the two fluids relative to one another within the body of the valve whereby flow is controlled by a mandrel-supported flexible sleeve, the mandrel having at least one indentation on its surface, whereby movement of the mandrel, relative to the flow paths of the two fluids permits deformation of the sealing sleeve into the indentation or indentations, thereby permitting flow through the valve.

It is contemplated that the arrangement of the fluid inlet ports one relative to the other, in combination with the indentation or indentations in the movable mandrel are such that the total and relative quantities of fluid flow may be controlled by appropriate longitudinal and angular positioning of the mandrel within its sleeve relative to the inlet ports.

In one embodiment it is contemplated that the two fluid inlet ports may be arranged in general axial alignment one with the other along the length of the faucet body, a mixing passage or recess being displaced angularly from the respective inlet ports on the inner surface of the faucet body, the movable mandrel being indented or recessed in such a fashion that rotational movement of the mandrel relative to the inlet ports will control flow cut-off between the inlets and the mixing passage and effect general control of quantity of flow, while longitudinal movement of the mandrel relative to the ports, will vary the proportion of the mixed fluids admitted within the control valve body, and effect individual flow termination for the respective sources.

In a preferred embodiment, the inlet ports are generally arranged at the same longitudinal position relative to the flow control sleeve, the flow outlet being axially displaced therefrom, whereby axial movement of the mandrel relative to the inlet ports will permit flow and effect general control of the flow quantity, while angular rotation of the mandrel recess or recesses relative to the inlet port will control the proportions of fluid flow.

While being particularly suited for use as a faucet for controlling the flow of water, it is contemplated that the flow control valve is not limited thereto. It can be seen that the invention provides a simple and durable flow control device the operation thereof being effected by a single moving member.

Figure 4:
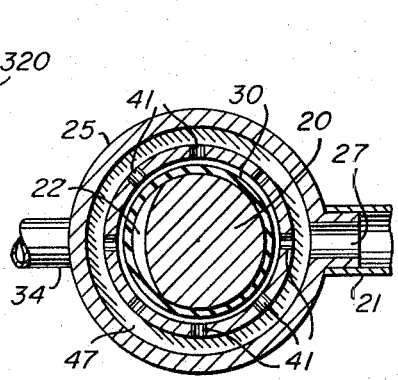
Figure 2:
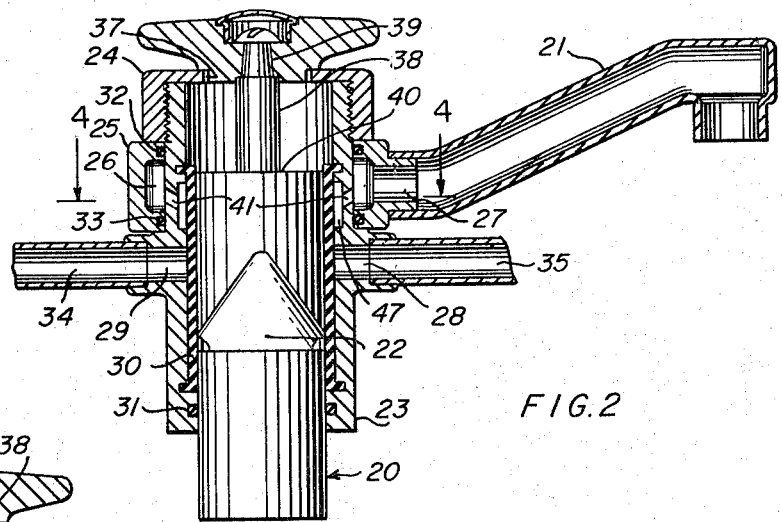
Figure 3:
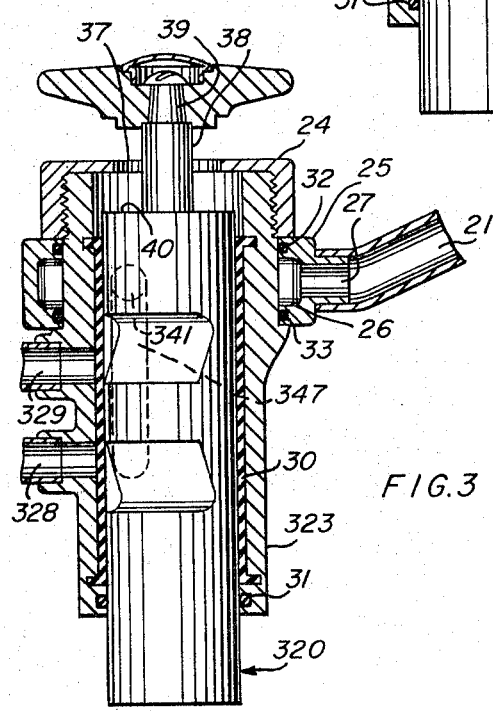

In the drawings
FIGURE 1 is an elevation view of the control mandrel, FIGURE 1A showing a form of the mandrel cut-out, and
FIGURE 1B being a symmetrical longitudinal section thereof; and
FIGURE 2 shows a section arrangement of the preferred embodiment, having the inlet ports in longitudinal correspondence; and
FIGURE 3 is a diagrammatic arrangement showing relative positions of the inlet ports, the mandrel and the outlet ports for an alternative arrangement, wherein the fluid inlet ports are in longitudinal alignment; and
FIGURE 4 is a sectional plan through line 4—4 of FIGURE 2; and
FIGURE 5 shows a mandrel suitable for use with an arrangement as illustrated in FIGURE 3.

As illustrated in FIGURE 2 the faucet comprises a generally cylindrical body 23 having fluid inlets 28 and 29 and fluid outlets 41. The faucet spout 21 is shown swingably mounted on a rotatable spout housing 25. Within the central bore of the faucet body 23, an annular mixing passage 47 connects by way of the ports 41 to an annular collecting passage 26 of the rotatable spout housing 25.

Flow between the fluid inlets 28, 29 and the mixing passage 47 is controlled by a resilient sleeve 30 which is held in flow controlling positions by a movable mandrel 20.

The mandrel 20 as shown in FIGURES 1A and 1B has a recess 22 in its cylindrical body 40, and is adapted to be moved by its spindle 38 which has a tapered portion 39 suitable for receiving a handle as illustrated.

It will be seen from FIGURE 2 that axial displacement of the mandrel upwardly from the position shown will bring the recess 22 into correspondence with the inlets 28 and 29, at which position the resilient sleeve 30 may be deflected into the mandrel recess under fluid pressure, supplied by pipes 34 and 35, so that pressure fluid may then enter the body 23 of the faucet and flow to the annular mixing passage 47, and thence by way of outlets 41 to the collecting passage 26 of the rotatable spout housing 25, and so into the spout 21.

With the mandrel 20 axially positioned to permit flow from both of the inlets to the mixing passage, it will be seen that angular rotation of the mandrel 20 without any change in its longitudinal position will then produce increased sleeve deflection adjacent one inlet port, with a corresponding decreased sleeve deflection adjacent the other inlet port, so that the proportions of the flow are correspondingly varied.

While the inlets 28 and 29 are shown to be in opposed relation, i.e. 180° to one another (reference FIGURE 4), and the mandrel recess 22 can be seen to extend for more than 180° around the periphery of the mandrel 20, it will nevertheless be evident that the fluid inlet 28 and 29 may be brought into closer angular correspondence one with the other, and corresponding changes can be made in the mandrel 20. Correspondingly the flow characteristics of the faucet are dictated by the profile and form of the recess 22, and this can be modified to suit particular requirements.

In the embodiment illustrated in FIGURE 3 the faucet body 323 has fluid inlets 328 and 329. Angularly displaced from these inlet ports is an axially extending mixing passage 347 recessed into the inner wall of the faucet body 323, and communicating at its upper end through the wall by way of the outlet 341 shown in phantom. As with the arrangement shown in FIGURE 2, the rotatable spout housing 25 mounted on the outside of the faucet body 323 is connected by way of its annular passage 26 with the outlet port 341 and the spout 21.

The mandrel 320 illustrated in FIGURE 5 has a pair of circumferentially extending recesses 322 of diminishing depth, in both the circumferential and longitudinal direction, the depth of the recesses being diminished adjacent the land 340. The cylindrical land 340 serves to separate the indentations or recesses 322 one from the other.

In operation, with the land 340 centrally located between inlets 328 and 329, rotation of the mandrel 320 initially brings the reduced portion of the recesses 322 into correspondence with the inlet ports 328 and 329 whereby the resilient sleeve 30 is permitted to deflect under fluid pressure and fluid may then flow between the inlet ports 328, 329 and the axially extending mixing passage 347, and thence by way of outlet 341 to the spout housing and the spout 21. Further rotation of the mandrel results in a progressive increase in flow. It will be seen that from this central position of the mandrel 320 axial displacement of the mandrel upwardly or downwardly will proportionately vary the relative flow capability between the respective inlets. Thus in general the quantity of flow is controlled by axial rotation of the mandrel 320 while the proportioning of the flow is controlled by the relative axial position of the mandrel to the inlet ports. It can further be seen that axial displacement of the land 340 is sufficient for this land to cause complete obturation of flow from either inlet 328 or inlet 329, by downward or upward mandrel displacement respectively. Because of the increase in cross-sectional area of the recesses 322 with increase of axial distance from the land 340, compensatory proportioning is achieved, so that as flow through one inlet diminishes due to axial displacement of the mandrel, the flow through the other inlet increases correspondingly, thus maintaining the total flow quantity generally constant for the particular angular setting of the mandrel. It will be seen that while the particular embodiments are directed to a single handle mixing faucet, a device of this nature may be used for mixing fluids of different sorts, and in view of the small number of moving parts, and the manner in which the resilient sleeve produces flow obturation, a device of this type is particularly suited for handling corrosive fluids. Thus, while it is necessary in such a case to make the fluid handling components of a non-reactive material, the mandrels which control the flow do not come into contact with the material being handled, and may therefore be made of any suitable material regardless of its reactivity with the fluid being handled.

A further characteristic of the faucet is the simplicity with which a mandrel 20 or 320 having particular flow characteristics as controlled by the recesses 22 or 322 respectively can be replaced by a mandrel possessing a different flow controlling characteristic. Alternatively, it is possible to employ a mandrel having a series of spaced recesses to control or mix a greater plurality of fluids, or to provide alternative flow characteristics. It may also be seen that mandrel replacement can be effected without the necessity for interrupting the fluid pressure, as by turning off water supply etc., as one mandrel may be used to displace the preceding mandrel. In this regard it is contemplated that the mandrels may be suitably recessed at their lower ends to accept the entry of the spindle 38 of the replacement mandrel being inserted, thereby permitting the removal of the first mandrel with simultaneous insertion of a replacement mandrel. Such an operation would merely entail the removal of the control handle shown, and the retaining nut 24.

In the arrangement shown in FIGURE 2, the rotatable spout housing 25 and the mandrel 20 are both secured to the faucet body 23 by means of the retaining nut 24. The provision of a corresponding retaining nut on the low portion of the faucet body, or a recessed retaining nut to shield or contain the lower end of mandrel 20 is contemplated.

The resilient sleeve 30 is shown fixed to the faucet body 23 by means of grooves or recesses. It will be seen that the sleeve 30 can alternatively be secured to the mandrel 20, in which case the mandrel need not be cylindrical.

In order to prevent tearing or undue wear of the sleeve 30 it is desirable that sharp edges be avoided, both on the surfaces of the mandrel and the surfaces of the faucet body contacted by the sleeve.

Suitable rubber or plastic O-rings 31, 32 and 33 provide fluid seals for the moving parts of the device. It can be seen that by extending the mandrel 20 in an axial direction a further O-ring seal at the top end of the mandrel may also be conveniently provided.

While a swingable faucet spout 20 has been illustrated, it will be seen that alternatively a fixed spout may be employed, or the flow may be directed by way of a hollow portion in the mandrel to a spout connected thereto, thereby providing a mixing faucet having a single moving part, with a corresponding simplification in the sealing requirements.

While this faucet is of particular value as a mixing device, it can be seen that this principle may be utilized to provide a simple flow control device for a single fluid. The mixing faucet disclosed may itself selectively function in this fashion for either of the two water supplies shown.

What we claim as our invention is:

1. A fluid flow control valve operable as a hot water mixing faucet and comprising a faucet body having a first and second water inlet in axially displaced relation connected to a central passage in said body, an axially extending mixing recess in said central passage adjacent said first and second water inlets and connected to an outlet from said body, a mandrel positioned within said central passage having two axially spaced recesses on the surface thereof, said recesses extending circumferentially about a substantial portion of said surface and diminishing in depth in both the circumferential and longitudinal directions, said recesses diminishing in the longitudinal direction to a land separating said recesses, said land extending longitudinally a distance substantially equal to the distance between said first and second water inlets, each of said recesses extending circumferentially a distance sufficient to span between an inlet and said mixing recess, a resilient sleeve covering said recesses and interposed between said mandrel and said inlet, said mandrel being adapted for axial movement whereby one of said recesses is moved toward or away from correspondence with said first inlet while the other recess is moved away from or toward correspondence, respectively, with the second inlet, correspondence of a recess with an inlet permitting deformation of said sleeve into the recess and variations in axial position of the mandrel producing variations in the relative amounts of fluid flowing from said first and second inlets to said mixing recess; said mandrel also being adapted for rotational movement whereby said recesses are moved equally toward or away from correspondence with said inlets to thereby vary the total volume of fluid flowing from said inlets to said mixing recess.

2. A fluid flow control valve operable as a hot water mixing faucet and comprising a faucet body having a first and a second water inlet connected to a central passage in said body, said water inlets being radially displaced one from the other, an annular mixing recess in said central passage longitudinally displaced from said first and second water inlets and connected to an outlet from said body, a mandrel positioned within said central passage having an indentation in the surface thereof of sufficient axial extent to span said inlets and said mixing recess, said indentation diminishing in depth in both the longitudinal and circumferential directions, said indentation diminishing to zero in the longitudinal direction towards said mixing recess, a resilient sleeve being interposed between said mandrel and said central passage, said mandrel being movable longitudinally within said passage between a position whereas said indentation extends between said mixing recess and at least one of said first and second inlets whereby fluid at said one inlet deflects said resilient sleeve into said indentation and flows to said mixing recess, and a position whereas said indentation is displaced from said mixing recess and said inlets whereby fluid flow to said mixing recess is blocked; said mandrel being further movable rotatably whereby said indentation may be moved proportionally into and out of alignment with said first and second inlets respectively to thereby control the relative amounts of fluid flowing to said mixing recess from said first and second inlets when said mandrel is in said first mentioned longitudinal position.

References Cited by the Examiner

UNITED STATES PATENTS

| | | | |
|---|---|---|---|
| 2,870,790 | 1/1959 | Jordan | 137—625.17 |
| 3,026,907 | 3/1962 | Klinger | 137—625.17 |
| 3,087,507 | 4/1963 | Grant | 251—5 |
| 3,190,312 | 6/1965 | Classen | 251—331 |
| 3,195,573 | 7/1965 | Daumy | 137—625.4 |

FOREIGN PATENTS 1,334,433    7/1963    France.

M. CARY NELSON, *Primary Examiner.*

W. CLINE, *Assistant Examiner.*